Nov. 11, 1924.
W. H. OLDACH
PRECISION INTERPUPILLARY AND BRIDGE MEASURE
1,515,516
Original Filed Sept. 20, 1920  2 Sheets-Sheet 1
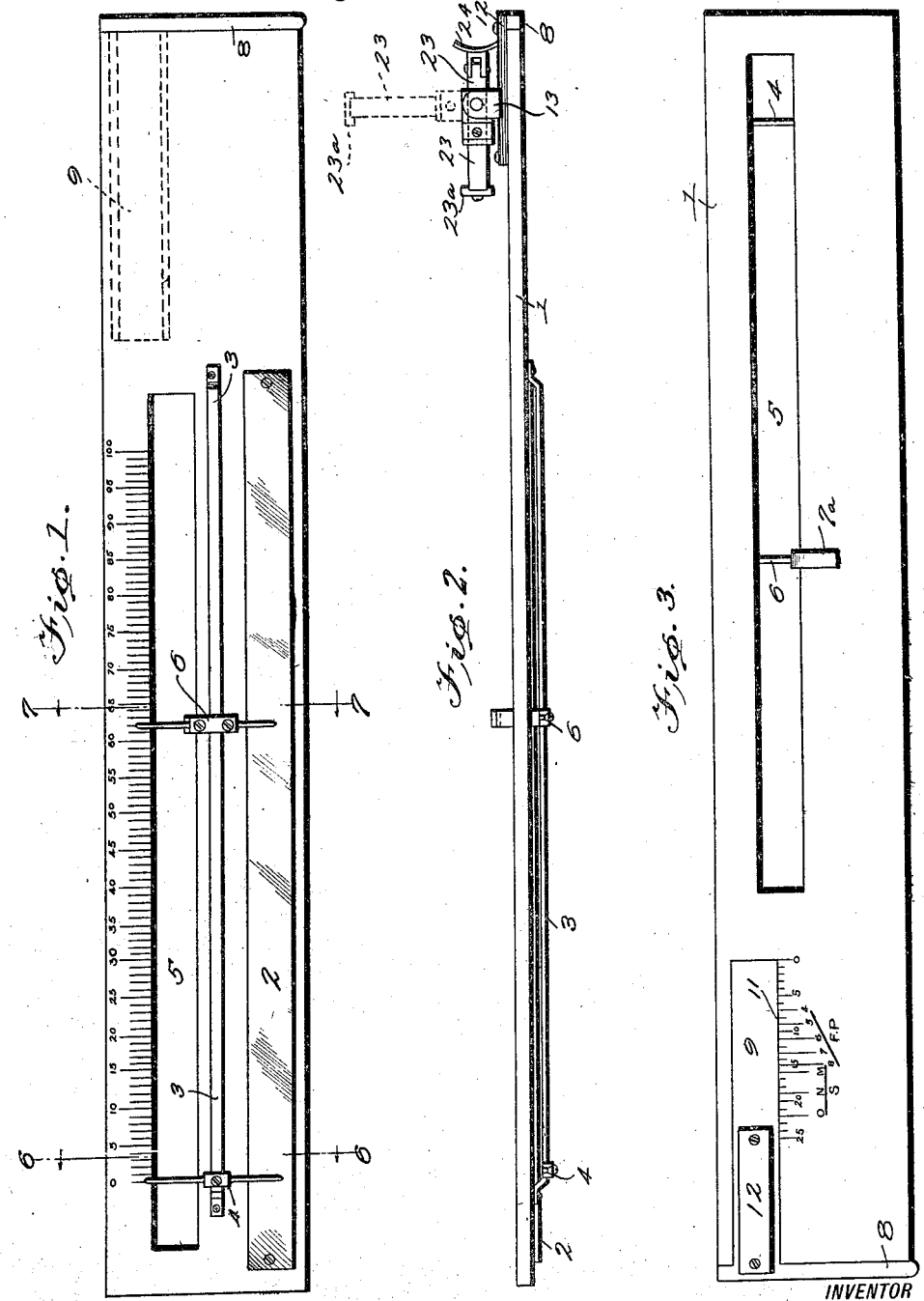
WITNESSES
INVENTOR
W. H. Oldach,
BY
ATTORNEYS

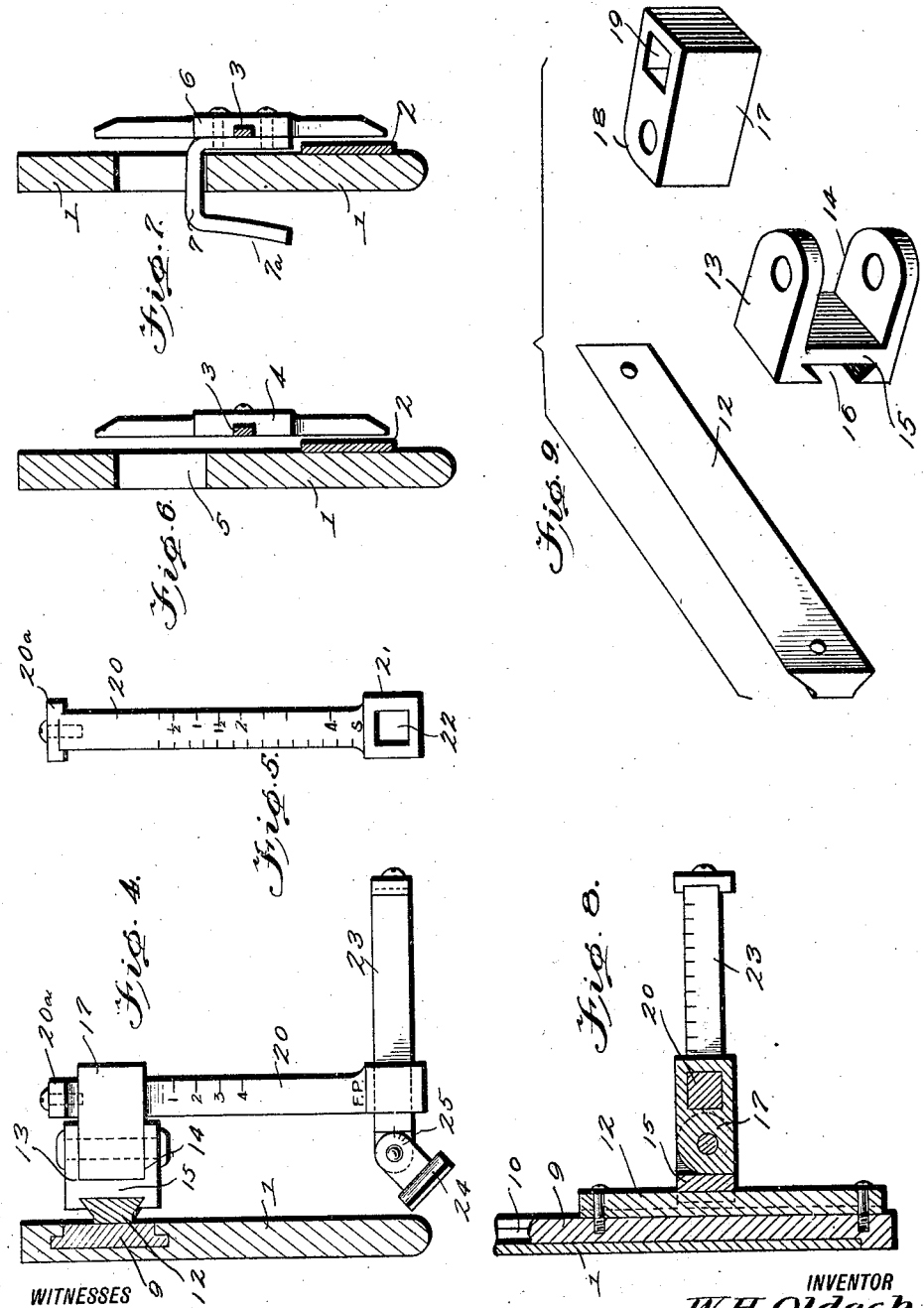

Patented Nov. 11, 1924.

1,515,516

UNITED STATES PATENT OFFICE.

WILLIAM HOWARD OLDACH, OF PANAMA, PANAMA.

PRECISION INTERPUPILLARY AND BRIDGE MEASURE.

Original application filed September 20, 1920, Serial No. 411,472. Divided and this application filed July 13, 1921. Serial No. 484,413.

*To all whom it may concern:*

Be it known that I, WILLIAM HOWARD OLDACH, a citizen of the United States, and a resident of Panama City, in the Republic of Panama, have invented certain new and useful Improvements in Precision Interpupillary and Bridge Measures, of which the following is a specification.

This application is a division of the application, Ser. No. 411,472, filed September 20, 1920, and relates to opticians' gages, and has reference more particularly to bridge measures, an object being to produce such a gage in rule form in which an interpupillary measure and a bridge measure are combined in rule form.

In the measurements for the fitting of frames for nose glasses or for spectacles it is necessary to determine accurately the pupillary distance, or the distance between the pupils of the eyes, and the bridge measurements.

Means have been devised to determine these various measurements, but these means have been usually of such construction as to permit only a limited number of the various measurements, or they comprise a cumbersome metal apparatus with numerous adjusting and complicated parts.

It is for the purpose of overcoming these difficulties and permitting wide range in measurements and at the same time securing accuracy that I have devised the present invention.

My invention, therefore, with the hereinbefore stated object, and others in view, consists in certain novel features of construction and arrangement of parts as will be hereinafter described and pointed out in the claims, reference being had to the accompanying drawings, in which, Figure 1 is a front view of my improvement, Figure 2 is a top edge view of the same, Figure 3 is a rear view, Figure 4 is a vertical section showing vertical and horizontal posts and mountings.

Figure 5 is a view in elevation of the vertical post,

Figure 6 is an enlarged vertical section taken on the line 6—6 of Figure 1,

Figure 7 is a similar view on the line 7—7 of Figure 1,

Figure 8 is an enlarged horizontal detail section showing caliper and post mounts, Figure 9 is a perspective view of the bracket slide, bracket and post block disassembled.

As shown in the various figures my rule consists of a graduated steel straight edge 1 having applied to its front face adjacent its lower edge, a mirror 2 which is of polished steel and secured to the straight edge by small screws as shown, or the reflecting area may be the highly polished face of the straight edge.

Above the reflecter a flat guide bar 3 is provided the ends thereof being screwed to the rule and between the ends, the bar being set off from the front face of the rule. Upon this bar adjacent the left end is placed a pointer 4, which is fixed and rigidly secured to the bar 3 by a tap screw.

Above the guide bar the rule is provided with an elongated slot 5 which is approximately of the same extent as the mirror, the upper edge of the slot being graduated as shown.

A movable pointer 6 is also mounted on the bar 3 being fitted to slide on said bar and being held to the same by a bent clip 7 one end of which extends through the slot 5, and the other end being secured to the back of the pointer 6 and against the guide bar by screws passing through the body of the pointer and into said end of the finger piece 7ª.

The success of spectacle and eyeglass fitting depends upon two factors, one the correctness of the lenses, the other and quite as important, the proper placing of the lenses before the eyes, and that the centers of the lenses be in a plane co-incident with a line drawn laterally of these lenses. To determine this it is necessary to determine the position of the crest of the finished spectacle bridge which will permit such a co-incidence.

To accomplish the above desiderata I have devised parts which correlate with the interpupillary measures which have just been set forth, and constitute the bridge measures.

The lower edge of the rule is rounded, and at the right hand end of the rule a T-head 8 is placed, said head being of the same thickness as the rule and also having its lower end rounded laterally and longitudnally.

This head is connected to the rule by a dove-tailed or under cut tongue 9 which slides in an under-cut or dove-tailed recess 10 in the rear face of the rule and extending from its right end inwardly a suitable distance to completely house the slide stem and permit the head to fit closely against the right end of the rule. One edge of this recess or groove is provided with the necessary graduations 11 which represent standard and finger piece measurements and millimeters.

Secured to the outer face of this tongue or stem 9 or made integral therewith if preferred, is an undercut rib or guide 12 upon which is fitted to slide a bracket, comprising upper and lower perforated jaws or ears 13 and 14 and a vertical connecting bar 15 having an undercut groove 16 which has a sliding fit on the undercut rib or guide 12.

Between the jaws of the bracket is hinged a block 17 having one rear corner rounded off as at 18 the free end of the said block having a rectangular aperture 19 therethrough in which is slidably mounted a vertical post 20 with graduations thereon. The lower end of this post carries a sleeve 21 having a rectangular aperture 22 therethrough in which slides a horizontal post 23, at one end of which is hinged a bridge pad 24 having a graduated quadrant 25, the horizontal post being graduated to register the lateral position of bridge crests in standard spectacles and finger piece bridge depths, and in millimeters, the nose pad has its quadrant graduated to register the angle of crest.

The vertical post and horizontal post are provided at their free ends with the overhanging caps 20ª and 23ª respectively.

The manner of using the device for interpupillary measurement is as follows:—

Interpupillary measurement is made by directing the subjects vision through the slot or aperture 5 in the instrument, at a fixed object; the rule is then held so that the eye nearest the fixed indicator or pointer 4 is bisected by same, observer's position being so that reflection in mirror of the observing eye is also bisected by the lower end of the pointer, and the movable pointer or indicator is adjusted so that the relation of the subject's other eye thereto and to the observer's other eye is the same as for the first mentioned eyes and pointer, reading being taken from the position of the movable pointer or indicator.

To take bridge measurement, the instrument is reversed and sliding end 8 drawn out making an aperture or space sufficiently wide to straddle bridge of nose, tightly if finger piece or eye glass measurement is desired; loosely if regular spectacle bridge measurement is desired; then with lower edge of rule bisecting pupils of eye horizontally adjustment of bridge pad on sliding vertical and horizontal posts is made, base of bridge being read from instrument caliper or slide, height from vertical post, and angle of crest from quadrant on bridge pad. The inside plane of rule will be plane of lens.

As it is essential to set the lenses as close to the eyes as it is possible without coming in contact with the lashes in taking bridge measurements, this is accomplished by regulating the length of the shank to the finished eyeglass or spectacle bridge. To secure this dimension the horizontally sliding post 23 is so adjusted that with the rule held with its base bisecting the pupils horizontally, said rule lies a sufficient distance before the eyes to avoid contact with lashes or eyeballs.

To insure comfort the crest of the bridge must coincide in its angle with the angle of the crest of the nose. This angle is secured and indicated by the graduated quadrant 25 of the swivel bridge pad 24.

The important and special features of the bridge measure herein set forth lie in the ability to read direct from the scales in either millimeters or standard spectacle and finger-piece eyeglass dimensions.

I claim:

1. A device of the character described comprising a straight edge having a groove extending longitudinally thereof and having graduations along one edge of the groove, a gauge slidable in said groove and adapted to cooperate with said graduations to indicate the width of the base of the bridge of the nose, a block hinged to said gage, a vertical post movably supported by said block, a horizontal post movably supported by said vertical post, and a bridge pad hingedly connected to one end of said horizontal post, said bridge pad being provided with a graduated quadrant and said horizontal post being adapted to cooperate with the graduations of said quadrant to indicate angles of the bridge crests.

2. In a device of the character described, a rule having a groove provided with graduations along one edge thereof, a gage slidable in said groove, a bracket slidably mounted on said gage, an apertured block pivotally attached to the bracket, a vertical post slidably mounted in the aperture of said block, said post being graduated to indicate standard spectacle and finger-piece bridge heights, a horizontal post slidably supported at the lower end of said vertical post, said horizontal post being graduated to indicate lateral positions of bridge crests in standard spectacle and finger piece depths, and a bridge pad pivotally connected to one end of said horizontal post, said pad having a graduated quadrant thereon and said horizontal post being adapted to cooperate with the graduations of said quadrant to indicate angles of bridge crests.

WILLIAM HOWARD OLDACH.